(12) United States Patent
Kim et al.

(10) Patent No.: US 10,579,848 B2
(45) Date of Patent: Mar. 3, 2020

(54) DISPLAY DEVICE AND METHOD OF DRIVING THE DISPLAY DEVICE

(71) Applicant: Samsung Display Co., Ltd., Yongin-si (KR)

(72) Inventors: Jin Woo Kim, Yongin-si (KR); Jin Oh Kwag, Yongin-si (KR); Hai Jung In, Yongin-si (KR); Won Jun Choe, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 164 days.

(21) Appl. No.: 15/831,317

(22) Filed: Dec. 4, 2017

(65) Prior Publication Data

US 2018/0285619 A1    Oct. 4, 2018

(30) Foreign Application Priority Data

Mar. 31, 2017 (KR) .................. 10-2017-0041675

(51) Int. Cl.
*G06K 9/00* (2006.01)
*G06F 21/32* (2013.01)
(Continued)

(52) U.S. Cl.
CPC ......... *G06K 9/00013* (2013.01); *G06F 21/32* (2013.01); *G09G 3/3208* (2013.01);
(Continued)

(58) Field of Classification Search
CPC ................ G06F 21/32; G06K 9/00013; G09G 2300/0426; G09G 2320/0626;
(Continued)

(56) References Cited

U.S. PATENT DOCUMENTS

2015/0254491 A1 9/2015 Mo et al.
2015/0033150 A1 11/2015 Nho et al.
(Continued)

FOREIGN PATENT DOCUMENTS

WO    2017/024850    2/2017

OTHER PUBLICATIONS

Extended European Search Report dated May 25, 2018, in European Patent Application No. 18164456.8.

*Primary Examiner* — Nirav G Patel
(74) *Attorney, Agent, or Firm* — H.C. Park & Associates, PLC

(57) ABSTRACT

A display device including a display panel including a display area including a fingerprint sensing area and a plurality of pixels provided in the fingerprint sensing area; a sensor layer provided on one surface of the display panel overlapping the fingerprint sensing area, the sensor layer including a plurality of photo sensors; a panel driving circuit configured to output a data signal corresponding to image data to the display panel, corresponding to a first mode, and to output a driving signal to the display panel to allow the pixels to emit lights in a form corresponding to a predetermined light pattern, corresponding to a second mode; and a fingerprint detecting circuit configured to receive sensing signals from the photo sensors, corresponding to the second mode, the fingerprint detecting circuit detecting a fingerprint of a user, based on a sensing signal corresponding to the light pattern among the received sensing signals.

20 Claims, 10 Drawing Sheets

(51) Int. Cl.
*G09G 3/3208* (2016.01)
*G09G 3/3233* (2016.01)
*G09G 3/3266* (2016.01)
*G09G 3/3275* (2016.01)

(52) U.S. Cl.
CPC ......... *G09G 3/3233* (2013.01); *G09G 3/3266* (2013.01); *G09G 3/3275* (2013.01); *G09G 2300/0426* (2013.01); *G09G 2300/0819* (2013.01); *G09G 2320/0626* (2013.01); *G09G 2330/021* (2013.01); *G09G 2354/00* (2013.01)

(58) Field of Classification Search
CPC ......... G09G 2330/021; G09G 2354/00; G09G 2360/14; G09G 3/3208; G09G 3/3233; G09G 3/3266; G09G 3/3275
See application file for complete search history.

(56) References Cited

U.S. PATENT DOCUMENTS

| | | | |
|---|---|---|---|
| 2015/0331508 A1* | 11/2015 | Nho | G06F 3/0421 345/173 |
| 2016/0224816 A1 | 8/2016 | Smith et al. | |
| 2017/0017824 A1 | 1/2017 | Smith et al. | |
| 2018/0365468 A1* | 12/2018 | Wang | G02F 1/13306 |

* cited by examiner

DISPLAY DEVICE AND METHOD OF DRIVING THE DISPLAY DEVICE

CROSS REFERENCE TO RELATED APPLICATION

This application claims priority from and the benefit of Korean Patent Application No. 10-2017-0041675, filed on Mar. 31, 2017, which is hereby incorporated by reference for all purposes as if fully set forth herein.

BACKGROUND

Field

Exemplary embodiments of the present invention relate to a display device and a method of driving the display device, and more particularly, to a display device including a fingerprint sensor and a method of driving the display device.

Discussion Of The Background

Recently, demands for display devices that provide various functions including fingerprint recognition have been increasing. In order to provide a display device capable of performing fingerprint recognition, a fingerprint sensor having a separate light source, for example, may be attached to a specific area of a display panel.

The above information disclosed in this Background section is only for enhancement of understanding of the background of the inventive concepts. Therefore, it may contain information that does not form the prior art that was already known to a person of ordinary skill in the art or was publically available prior to an effective filing date of subject matter disclosed herein.

SUMMARY

Exemplary embodiments of the present invention provide a display device capable of recognizing fingerprints using light generated inside a display panel and a method of driving the display device.

Additional features of the invention will be set forth in the description which follows, and in part will be apparent from the description, or may be learned by practice of the invention.

An exemplary embodiment of the present invention discloses a display device including: a display panel including a display area including a fingerprint sensing area and a plurality of pixels provided in the fingerprint sensing area; a sensor layer provided on one surface of the display panel overlapping the fingerprint sensing area, the sensor layer including a plurality of photo sensors; a panel driving circuit configured to output a data signal corresponding to image data to the display panel, corresponding to a first mode, and to output a driving signal to the display panel to allow the pixels to emit lights in a form corresponding to a predetermined light pattern, corresponding to a second mode; and a fingerprint detecting circuit configured to receive sensing signals from the photo sensors, corresponding to the second mode, the fingerprint detecting circuit detecting a fingerprint of a user, based on a sensing signal corresponding to the light pattern among the received sensing signals.

Additional features of the invention will be set forth in the description which follows, and in part will be apparent from the description, or may be learned by practice of the invention.

The sensing signal may include first and second sensing signals having a waveform corresponding to the light pattern but have different magnitudes and different phases. The fingerprint detecting circuit may detect a shape of the fingerprint, based on the first and second sensing signals.

The panel driving circuit may generate the driving signal such that at least one of the amplitude, pulse width, phase, and frequency of lights emitted from the pixels is changed during a period in which the display device is driven in the second mode.

The driving signal may be a sensing data voltage having a voltage level changed depending on a certain period during the period in which the display device is driven in the second mode, the sensing data voltage being supplied to data lines coupled to the pixels.

The period may be set to one frame.

The panel driving circuit may supply the driving signal to the pixels while sequentially scanning the pixels provided in the fingerprint sensing area during each frame period in the period in which the display device is driven in the second mode.

The pixels provided in the fingerprint sensing area may sequentially emit lights according to a scanning sequence thereof during each frame period, or simultaneously emit lights during a predetermined emission period in the frame period.

Each of the pixels may include a light emitting device, and a transistor located on a current path along which driving current flows through the light emitting device, the transistor being turned on corresponding to the driving signal.

The transistor may be repeatedly turned on and turned off during the period in which the display device is driven in the second mode.

The driving signal may have a voltage level changed for every certain time during the period in which the display device is driven in the second mode.

The driving signal may have a gate-on voltage that allows the transistor to be turned on during a first period in the period in which the display device is driven in the second mode, and a gate-off voltage that allows the transistor to be turned off during a second period subsequent to the first period.

The gate-on voltage may include a plurality of voltage levels that allow the transistor to be turned on to different degrees.

The voltage level of the driving signal may be changed plural times during each frame period in the period in which the display device is driven in the second mode.

Each of the pixels may include: a light emitting device coupled between a first power source and a second power source; a first transistor coupled between the first power source and the light emitting device, the first transistor having a gate electrode coupled to a first node; a second transistor coupled between the first node and a data line, the second transistor having a gate electrode coupled to a scan line; third and fourth transistors coupled in series between the first power source and the first transistor, the third and fourth transistors having gate electrodes respectively coupled to a first control line and a second control line; and a capacitor coupled between the first node and the first power source.

The panel driving circuit may supply the same sensing data voltage to the pixels while sequentially supplying a scan signal having a gate-on voltage and a first control signal having a gate-off voltage respectively to a scan line and a first control line on each horizontal line provided in the fingerprint sensing area during each frame period in the period in which the display device is driven in the second mode.

The panel driving circuit may simultaneously supply the same second control signal to the second control lines of the pixels during each frame period in the period in which the display device is driven in the second mode. The voltage level of the second control signal may be repeatedly changed to a gate-on voltage or a gate-off voltage during each frame period.

The display panel may further include a plurality of pixels provided in the remaining display area except the fingerprint sensing area, each of the plurality of pixels having the same structure as each of the pixels provided in the fingerprint sensing area. The panel driving circuit may continuously supply a second control signal having a gate-on voltage to second control lines coupled to the pixels of the remaining display area.

During the period in which the display device is driven in the second mode, a voltage level of the driving signal may be repeatedly changed corresponding to the light pattern, and a luminance of the pixels may be changed corresponding to the voltage level of the driving signal.

An exemplary embodiment of the present invention also discloses a method of driving a display device that includes a display panel including a fingerprint sensing area in which a plurality of pixels are provided and a plurality of photo sensors provided on one surface of the display panel overlapping the fingerprint sensing area, the method including: outputting a data signal corresponding to image data to the display panel, corresponding to a first mode; and receiving sensing signals from the photo sensors while supplying a driving signal corresponding to a predetermined light pattern to the display panel, corresponding to the second mode, and detecting a fingerprint of a user, based on a sensing signal corresponding to the light pattern among the received sensing signals.

The sensing signal may include first and second sensing signals having a waveform corresponding to the light pattern but have different magnitudes and different phases. A shape of the fingerprint may be detected based on the first and second sensing signals during a period in which the display device is driven in the second mode.

The driving signal may be generated such that at least one of the amplitude, pulse width, phase, and frequency of lights emitted from the pixels is changed during the period in which the display device is driven in the second mode.

At least one of the instantaneous luminance and emission state of the pixel may be repeatedly changed corresponding to the light pattern during the period in which the display device is driven in the second mode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION OF THE ILLUSTRATED EMBODIMENTS

Figure 1:
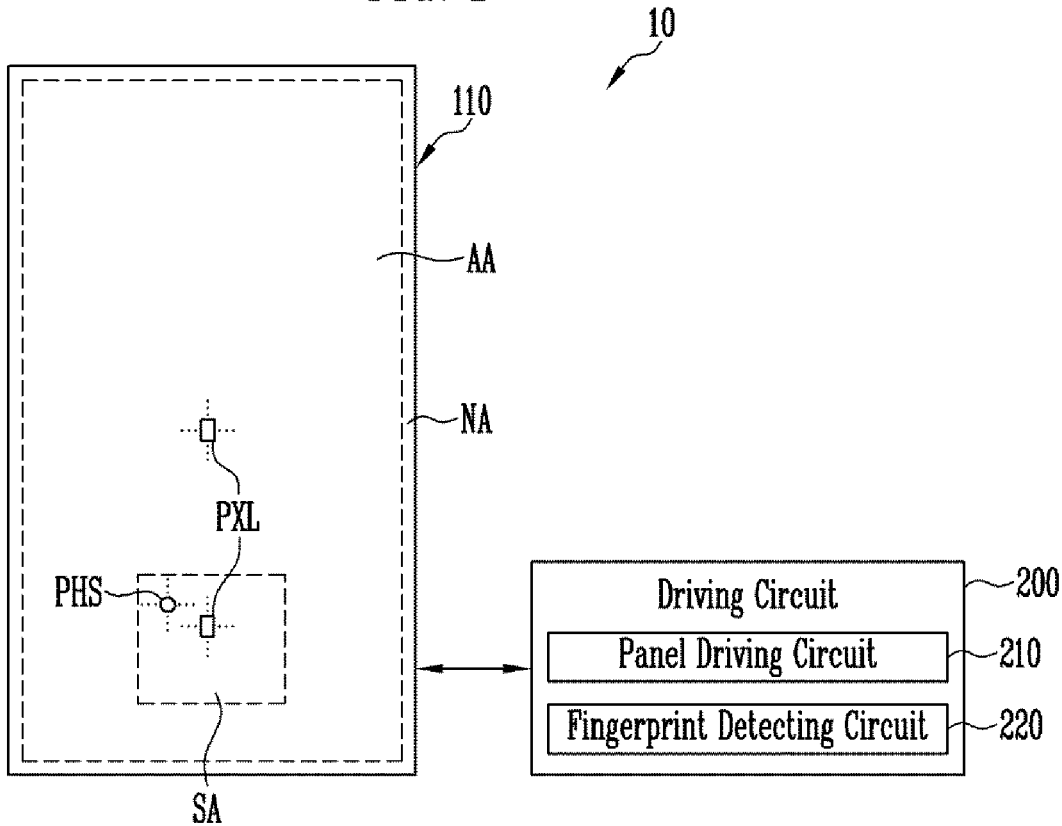
FIG. 1 is a combined schematic plan view and block diagram of a display device according to an embodiment of the present disclosure.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Unless otherwise specified, the illustrated exemplary embodiments are to be understood as providing exemplary features of varying detail of various exemplary embodiments. Therefore, unless otherwise specified, the features, components, modules, layers, films, panels, regions, and/or aspects of the various illustrations may be otherwise combined, separated, interchanged, and/or rearranged without departing from the disclosed exemplary embodiments. Further, in the accompanying figures, the size and relative sizes of layers, films, panels, regions, etc., may be exaggerated for clarity and descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. Further, the x-axis, the y-axis, and the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein Hereinafter, exemplary embodiments of the present disclosure will be described in detail with reference to the accompanying drawings. However, the present disclosure is not limited to the embodiments but may be implemented into different forms. These embodiments are provided only for illustrative purposes and for full understanding of the scope of the present disclosure by those skilled in the art.

Meanwhile, in the following embodiments and the attached drawings, elements not directly related to the present disclosure are omitted from depiction, and dimensional relationships among individual elements in the attached drawings are illustrated only for ease of understanding but not to limit the actual scale. It should note that in giving reference numerals to elements of each drawing, like reference numerals refer to like elements even though like elements are shown in different drawings.

Figure 2:
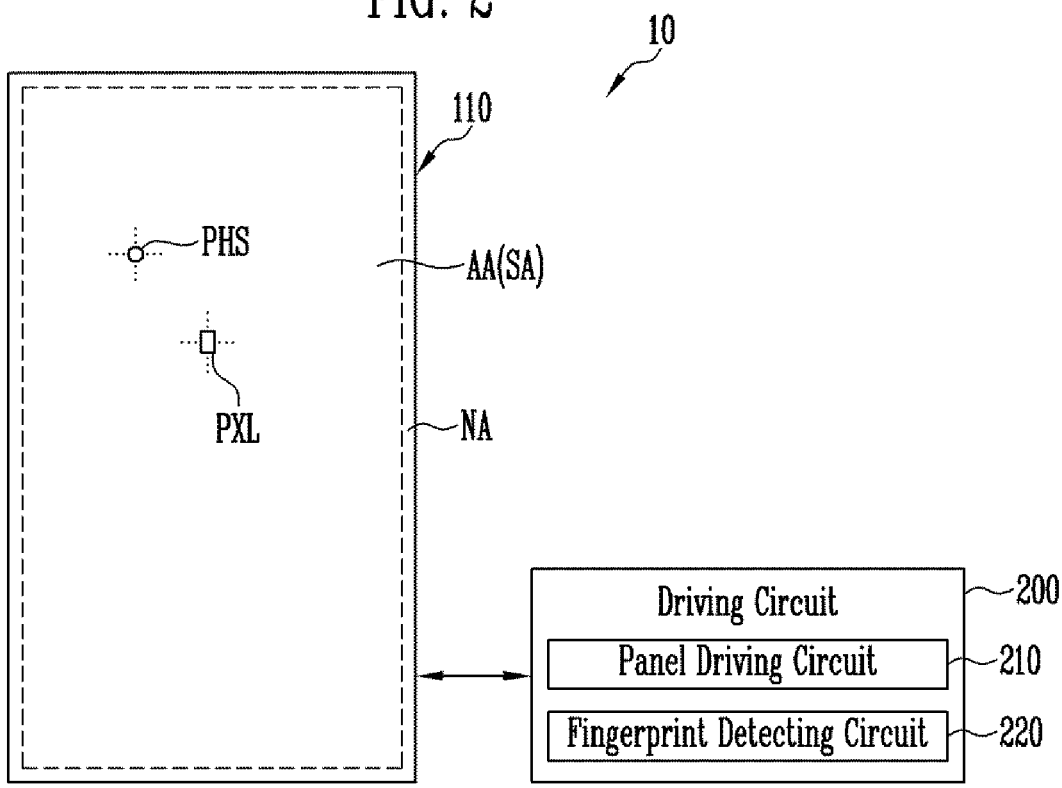
FIG. 2 is a combined schematic plan view and block diagram of a display device according to an embodiment of the present disclosure.

FIGS. 1 and 2 each schematically illustrates a display device according to an embodiment of the present disclosure. In particular, FIGS. 1 and 2 each schematically illustrates a display panel provided in the display device according to the embodiment of the present disclosure and a driving circuit for driving the display panel. For convenience, a case where the display panel and the driving circuit are separated from each other is illustrated in FIGS. 1 and 2, but the present disclosure is not limited thereto. For example, at least one part of the driving circuit may be implemented on the display panel.

Referring to FIGS. 1 and 2, each display device 10 according to the embodiment of the present disclosure includes a display panel 110 and a driving circuit 200 for driving the display panel 110.

The display panel 110 includes a display area AA and a non-display area NA. The display area AA is an area in which a plurality of pixels PXL are provided, and is also referred to as an active area. In some embodiments, each of the pixels PXL may include at least one light emitting device. The display device 10 displays an image in the display area AA by driving the pixels PXL, corresponding to image data input thereto.

In some embodiments, the display area AA may include a fingerprint sensing area SA. That is, at least one part of the display area AA may be set as the fingerprint sensing area SA. In an embodiment, as shown in FIG. 1, only a predetermined partial area in the display area AA may be set as the fingerprint sensing area SA. In another embodiment, as shown in FIG. 2, the entire display area AA may be set as the fingerprint sensing area SA. That is, the fingerprint sensing area SA may be an area in which at least some pixels PXL provided in the display area AA are located, and a plurality of pixels PXL may also be provided in the fingerprint sensing area SA.

The non-display area NA is an area located at the periphery of the display area AA, and is also referred to as a non-active area. In an embodiment, the non-display area NA may comprehensively mean the remaining panel area except the display area AA. In some embodiments, the non-display area NA may include a wiring area, a pad area, and/or various dummy areas.

In the embodiment of the present disclosure, the display device 10 further includes a plurality of photo sensors PHS provided in the fingerprint sensing area SA. In some embodiments, the photo sensors PHS may overlap with at least some of the pixels PXL provided in the fingerprint sensing area SA, or be disposed at the periphery of the pixels PXL. In an embodiment, at least some of the photo sensors PHS may be provided between the pixels PXL.

In some embodiments, the display device 10 may be driven in a first mode or a second mode under a predetermined use condition. In some embodiments, the first mode may be a normal display mode for displaying an image corresponding to image data, and the second mode may be a fingerprint sensing mode for sensing a fingerprint of a user.

In an embodiment, the display device 10 may be driven in the first mode or the second mode under various conditions including a specific use environment, a content, an application program, and/or a selection of the user. For example, when a specific application program that requires user verification is executed, the mode of the display device 10 may be changed from the first mode to the second mode.

In some embodiments, the driving circuit 200 drives the display panel 110 in different manners corresponding to the respective modes. In an embodiment, the driving circuit 200 may output a data signal corresponding to image data to the display panel 110, corresponding to the first mode, and receive sensing signals from the photo sensors PHS while outputting a driving signal corresponding to a predetermined light pattern to the display panel 110, corresponding to the second mode. The driving circuit 200 receiving the sensing signals may detect a fingerprint shape (or pattern) of the user, using the sensing signals. Accordingly, the display device 10 can provide a fingerprint recognition function.

To this end, the driving circuit 200 may include a panel driving circuit 210 and a fingerprint detecting circuit 220. A case where the panel driving circuit 210 and the fingerprint detecting circuit 220 are separated from each other is illustrated in FIGS. 1 and 2, but the present disclosure is not limited thereto. In an embodiment, at least one part of the fingerprint detecting circuit 220 may be integrated with the panel driving circuit 210, or operate in interlock with the panel driving circuit 210.

That is, the driving circuit 200 may comprehensively include the panel driving circuit 210 that drives the display panel 110 in different manners corresponding to the respective first and second modes, and the fingerprint detecting circuit 220 that detects a fingerprint, based on sensing signals received from the photo sensors PHS when the display panel 110 emits light in a predetermined form, corresponding to the second mode. In some embodiments, the panel driving circuit 210 and the fingerprint detecting circuit 220 may be configured as separate components to be separated from each other, or at least parts of the panel driving circuit 210 and the fingerprint detecting circuit 220 may be integrally implemented. In some embodiments, the panel driving circuit 210 may drive the display panel 110 in different manners corresponding to the respective first and second modes by using the same circuit (e.g., a scan driver and/or a data driver), or be separately provided with circuits for driving the display panel 110 corresponding to the respective first and second modes.

In some embodiments, the panel driving circuit 210 may supply a data signal corresponding to image data to the pixels PXL in the display area AA while sequentially scanning the pixels PXL, corresponding to the first mode. Then, the display panel 110 displays an image corresponding to the image data during a period in which the first mode is executed.

In some embodiments, the panel driving circuit 210 may supply a predetermined driving signal to the pixels PXL of at least the fingerprint sensing area SA, corresponding to the second mode. In some embodiments, the driving signal may be a sensing data voltage supplied to the pixels PXL of the fingerprint sensing area SA during a period in which the second mode is executed, or a predetermined control signal for controlling an emission state or emission timing (e.g., an emission time point and/or a duration) of the pixels PXL. In an embodiment, the panel driving circuit 210 may control the display panel 110 such that an image of a specific pattern is displayed in at least the fingerprint sensing area SA during the period in which the second mode is executed.

In particular, in the embodiment of the present disclosure, the panel driving circuit 210 outputs a driving signal corresponding to a predetermined light pattern to the display panel 110 such that the pixels PXL provided in at least the fingerprint sensing area SA emit lights in a form corresponding to the predetermined light pattern during the period in which the second mode is executed. That is, the pixels PXL of the fingerprint sensing area SA emit lights in a form corresponding to the light pattern during the period in which the display device is driven in the second mode.

In some embodiments, the fingerprint detecting circuit 220 receives sensing signals from the photo sensors PHS, corresponding to the second mode, and detects a finger (e.g., a fingerprint shape) of the user, based on sensing signals (effective sensing signals) corresponding to the light pattern among the received sensing signals.

In an embodiment of the present disclosure, the panel driving circuit 210 may supply a driving signal to the pixels PXL of the fingerprint sensing area SA to emit a light signal having a specific waveform during the period in which the second mode is executed, and the fingerprint detecting circuit 220 may define, as an effective sensing signal, a sensing signal corresponding to the waveform among sensing signals input from the photo sensors PHS, and detect a fingerprint of the user, based on the effective sensing signal. For example, the fingerprint detecting circuit 220 may compare at least one of characteristics of the sensing signals input from the photo sensors PHS, e.g., an amplitude, a pulse width, a phase difference, an inflection point, and/or a shape (e.g., a profile) of the waveform with a predetermined light pattern used to generate the driving signal, thereby detecting an effective sensing signal corresponding to the light pattern. The fingerprint detecting circuit 220 generates fingerprint information of the user, based on the detected effective sensing signal, so that it is possible to increase signal-to-noise ratio (SNR) and to improve the reliability of fingerprint recognition.

According to the above-described embodiment of the present disclosure, a fingerprint of the user is detected using lights emitted from the pixels PXL, so that a fingerprint sensor can be implemented without any separate external light source. For example, in an embodiment of the present disclosure, the fingerprint sensor may be configured using the pixels PXL provided in the fingerprint sensing area SA and photo sensors PHS provided in an area overlapping with at least the fingerprint sensing area SA. Accordingly, the thickness of the display device 10 can be decreased, and the manufacturing cost of the display device 10 can be reduced.

In particular, according the embodiment of the present disclosure, the emission of the pixels PXL is controlled corresponding to a predetermined light pattern during the period in which the display device 10 is driven in the second mode, and an effective sensing signal corresponding to the light pattern is detected from sensing signals received from the photo sensors PHS. Accordingly, a malfunction caused by light noise can be reduced, and the reliability of fingerprint recognition can be improved. The exemplary structure, fingerprint sensing principle, and driving method of the fingerprint sensor according to the embodiment of the present disclosure will be described in detail later.

Figure 3:
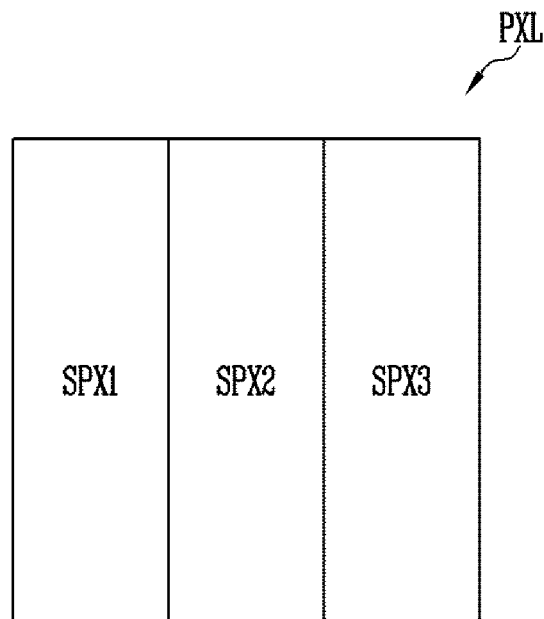
FIG. 3 schematic diagram of a pixel according to an embodiment of the present disclosure.

FIG. 3 schematically illustrates a pixel according to an embodiment of the present disclosure. For convenience, an example of a pixel that is provided in a stripe type display device and is configured with three sub-pixels is illustrated in FIG. 3, but the present disclosure is not limited thereto. That is, the shape of the pixel, the arrangement structure of the pixel, and/or the number of sub-pixels may be variously modified.

Referring to FIG. 3, the pixel PXL according to the embodiment of the present disclosure includes a plurality of sub-pixels SPX1, SPX2, and SPX3. In an embodiment, the pixel PXL may include first to third sub-pixels SPX1, SPX2, and SPX3 that emit lights of different colors.

In some embodiments, each of the sub-pixels SPX1, SPX2, and SPX3 may include at least one light emitting device. In an embodiment, the first sub-pixel SPX1 may include a light emitting device that emits light of a first color, e.g., red, the second sub-pixel SPX2 may include a light emitting device that emits light of a second color, e.g., green, and the third sub-pixel SPX3 may include a light emitting device that emits light of a third color, e.g., blue. However, the present disclosure is not limited thereto. For example, in another embodiment, the first to third sub-pixels SPX1, SPX2, and SPX3 may all include light emitting devices that emit light of white, and the color of light emitted from each of the sub-pixels SPX1, SPX2, and SPX3 may be controlled by a color filter, etc. As described above, the pixel PXL can emit lights of various colors, using the plurality of sub-pixels SPX1, SPX2, and SPX3 that emit lights of different colors.

Figure 4:
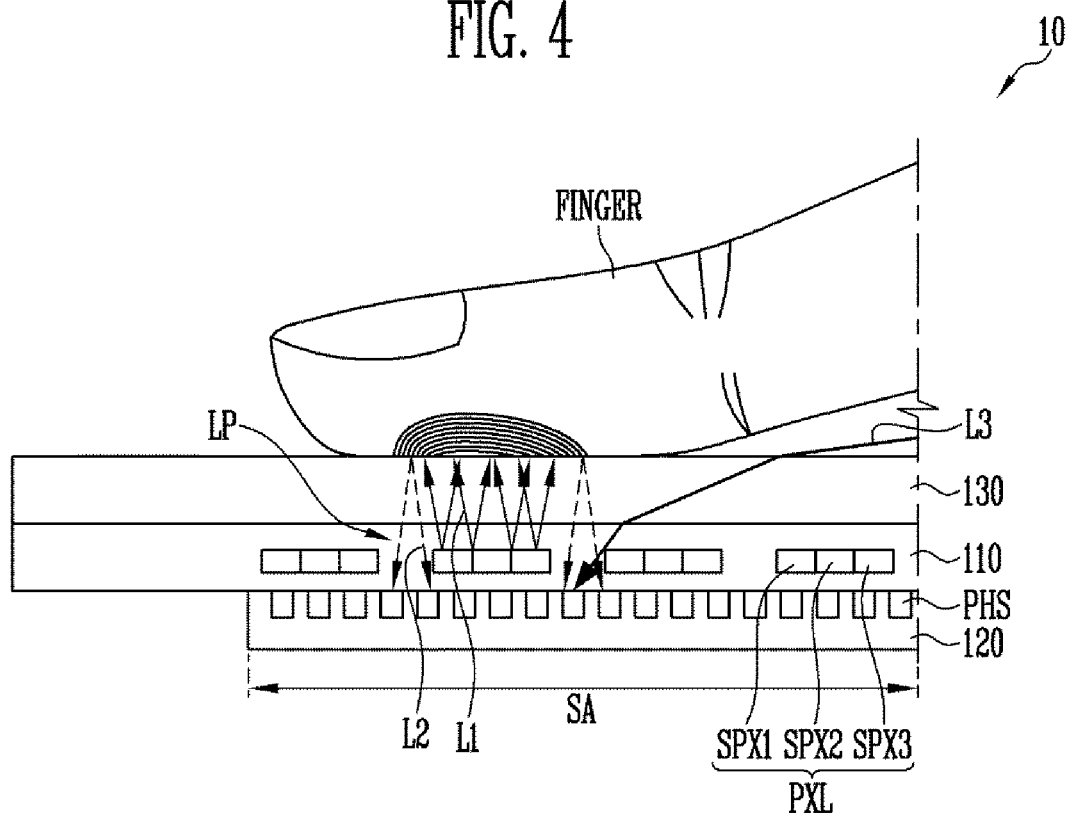
FIG. 4 is a partial cross-sectional side view of a fingerprint sensing area of a display device according to an embodiment of the present disclosure.

FIG. 4 schematically illustrates a fingerprint sensing area of a display device according to an embodiment of the present disclosure. In FIG. 4, components similar or identical to those of FIGS. 1 to 3 are designated by like reference numerals, and their detailed descriptions will be omitted.

Referring to FIG. 4, the display device 10 according to the embodiment of the present disclosure may include a display panel 110 including a plurality of pixels PXL, a sensor layer 120 provided on one surface of the display panel 110, and a window 130 provided on the other surface of the display panel 110.

In some embodiments, the display panel 110 may include a plurality of pixels PXL provided in at least a fingerprint sensing area SA, and a light-transmitting portion LP provided at the periphery of the pixels PXL.

In some embodiments, the light-transmitting portion LP may exist in a gap in which elements that block light, such as circuit devices (e.g., electrodes of a transistor, a capacitor, and/or a light emitting device) constituting each pixel PXL (or each sub-pixel SPX1, SPX2, or SPX3) and/or lines (e.g., a scan line, a data line, a control line, and/or a power line) coupled thereto, are not disposed. That is, light-transmitting areas through which light can be transmitted may be distributed in a display area AA. The light-transmitting areas may constitute the light-transmitting portion LP of the display panel 110.

In some embodiments, the light-emitting portion LP may include not only an area in which only transparent components (e.g., an insulating layer and the like) are disposed among areas of the display panel 110 but also all areas in which a part of light generated from the display panel 110 because its light transmittance is greater than 0% or light incident into the display panel 110 can be transmitted among areas in which opaque or translucent components are disposed. In an embodiment, the light-transmitting portion LP may also be located in at least one area among areas between emitting portions (i.e., areas in which light is emitted to the outside of the display panel 110 as areas in which emitting layers of the respective pixels PXL are provided) of the pixels PXL and/or an area in which a pixel defining layer is provided between the pixels PXL.

That is, the light-transmitting portion LP may exist in at least one area among areas at the inside and periphery of each of the pixels PXL (or the sub-pixels SPX1, SPX2, and SPX3) and areas between adjacent pixels PXL (or sub-pixels SPX1, SPX2, and SPX3) to be distributed in the display area AA.

In the display device 10 according to the embodiment of the present disclosure, when the display device 10 is driven in the second mode, the pixels PXL of the fingerprint sensing area SA may emit lights in a form corresponding to a predetermined light pattern, and at least some of reflected lights reflected from a finger (or a fingerprint) of a user among the lights emitted from the pixels PXL may be again incident into the display panel 110 through the light-transmitting portion LP. In addition, at least some of the reflected lights again incident into the display panel 110 may be incident into photo sensors PHS through the light-transmitting portion LP.

In some embodiments, the sensor layer 120 may include a plurality of photo sensors PHS provided on the one surface of the display panel 110. In particular, the photo sensors PHS may be provided in at least the fingerprint sensing area SA.

In some embodiments, the sensor layer 120 may be provided on a rear surface (e.g., a surface opposite to a surface on which an image is displayed) of the display panel 110. For example, the sensor layer 120 may be implemented as a sensor IC attached to the rear surface of the display panel 110. As described above, in the embodiment in which the sensor layer 120 is provided on the rear surface of the display panel 110, it is possible to prevent the image quality of the display panel 110 from being degraded by the sensor layer 120.

In some embodiments, at least some of the photo sensors PHS may overlap with at least one part of the light-transmitting portion, and receive lights incident by passing through the light-transmitting portion LP. In an embodiment, at least some of the photo sensors PHS may receive reflected light L2 that is emitted from at least one pixel PXL provided at the periphery thereof and reflected from a finger of the user, and output a sensing signal corresponding to the reflected light L2. The sensing signal may be input to the driving circuit 200 described above to be used in fingerprint detection. That is, in the display device 10 according to the embodiment of the present disclosure, a fingerprint sensor can be configured without any separate external light source by at least some pixels PXL and the photo sensors PHS, which are provided in the fingerprint sensing area SA.

In some embodiments, the size, number, arrangement form, and/or density (e.g., resolution) of the photo sensors PHS are not particularly limited. In an embodiment, the photo sensors PHS may be provided in at least the fingerprint sensing area SA to correspond to the pixels PXL or the sub-pixels SPX1, SPX2, and SPX3 one by one. Alternatively, in another embodiment, the photo sensors PHS may be provided in a number smaller than that of the pixels PXL or the sub-pixels SPX1, SPX2, and SPX3, to be distributed in the fingerprint sensing area SA according to a predetermined distance or distribution. Alternatively, in still another embodiment, the photo sensors PHS may be provided in a number larger than that of the pixels PXL or the sub-pixels SPX1, SPX2, and SPX3, to be densely distributed in the fingerprint sensing area SA. In some embodiments, the photo sensors PHS may be distributed in the sensor layer 120 with a density sufficient to detect the shape of a fingerprint, thereby constituting a sensor array.

In some embodiments, the window 130 may be provided opposite to the sensor layer 120 with the display panel 110 interposed therebetween. In an embodiment, the window 130 may be provided at a front surface (image display surface) of the display device 10. Meanwhile, in some embodiments, the window 130 may be omitted.

A fingerprint sensing method according to the above-described embodiment will be described. As described in FIGS. 1 and 2, when the display device 10 is driven in the second mode, the panel driving circuit 210 supplies a predetermined driving signal to the display panel 110. In some embodiments, the driving signal is generated such that at least some pixels PXL provided in the fingerprint sensing area SA emit light in a form corresponding to a predetermined light pattern. In an embodiment, the driving signal is supplied to at least some pixels PXL provided in the fingerprint sensing area SA such that the pixels PXL emit lights L1 having a specific waveform. In some embodiments, the predetermined light pattern and/or the specific wavelength may be set based on predetermined light characteristics such as intensity or amplitude, pulse width, phase, and frequency of light.

In some embodiments, in order to modulate the amplitude of the lights L1 emitted from the pixels PXL, the voltage level of the driving signal input to the pixels PXL of the fingerprint sensing area SA may be repeatedly changed during the period in which the second mode is executed. In an embodiment, during the period in which the second mode is executed, a sensing data voltage input to data lines coupled to the pixels PXL of the fingerprint sensing area SA may be repeatedly changed, or the voltage of a predetermined control signal for controlling turn-on/turn-off of switching elements (e.g., predetermined transistors) provided in the pixels PXL of the fingerprint sensing area SA may be repeatedly changed. Accordingly, the pixels PXL emits light with a luminance changed corresponding to the voltage level of the driving signal.

That is, according to an embodiment of the present disclosure, the emission of the pixels PXL provided in the fingerprint sensing area SA is controlled using a predetermined driving signal during the period in which the second mode is executed, so that the luminance of the pixels PXL is repeatedly changed a few times. In this case, the luminance of the pixels PXL may be changed depending on an instantaneous luminance of lights emitted from the pixels PXL at a predetermined time point and/or an emission state (e.g., an emission time point and/or an emission duration time) of the pixels PXL. Therefore, the driving signal may be set as at least one of signals capable of controlling the emission of the pixels PXL.

At this time, if it is assumed that a finger of the user is placed on the fingerprint sensing area SA so as to perform fingerprint recognition, at least some of reflected lights L2 reflected from the finger (particularly, a fingerprint part) of the user among the lights L1 emitted from the pixels PXL of the fingerprint sensing area SA pass through the light-transmitting portion LP. The reflected lights L2 passing through the light-transmitting portion LP are incident into photo sensors PHS corresponding to the light-transmitting portion LP.

Then, the photo sensors PHS output sensing signals corresponding to the incident reflected lights L2. Meanwhile, a plurality of photo sensors PHS are distributed and disposed with a density at which a fingerprint is distinguishable in the fingerprint sensing area SA. Therefore, the driving circuit 200 may detect the fingerprint of the user by synthesizing the sensing signals input from the photo sensors PHS. For example, the fingerprint detecting circuit 220 may detect an amount of received light of each of the photo sensors PHS (an amount of light incident into each of the photo sensors PHS during the period in which the second mode is executed) and/or a form of the reflected lights L2, using the sensing signals input from the photo sensors PHS, and generate fingerprint information of the user, using the amount of receive light and/or the form of the reflected lights L2. Specifically, the reflected lights L2 respectively reflected from ridges and valleys of the fingerprint have forms deformed differently from each other. Thus, the fingerprint detecting circuit 220 detects an amount of reflected light L2 incident into the photo sensor PHS at each position and/or a waveform of the reflected light L2, and distinguishes ridges and valleys of the fingerprint from each other, based on the amounts of the reflected lights L2 and/or the waveforms of the reflected lights L2.

However, in addition to the reflected lights L2 reflected from the fingerprint, some of the lights L1 emitted from the pixels PXL due to scattering generated in the display panel 110 and/or light L3 introduced from the outside may be incident into at least one photo sensor PHS. In this case, a noise component is included in a sensing signal output from the photo sensor PHS. The reliability of fingerprint detection may be degraded due to the noise component.

Accordingly, in the embodiment of the present disclosure, lights L1 emitted from the fingerprint sensing area SA during the period in which the second mode is executed are modulated and output in a specific form (or waveform). In addition, a sensing signal received from the sensor layer 120 is compared with the form of the emitted lights L1, and fingerprint information of the user is generated based on an effective sensing signal corresponding to the shape of the emitted lights L1. In an embodiment, the display device 10 according to the embodiment of the present disclosure may detect an effective sensing signal corresponding to the form of the emitted lights L1 modulated in a specific form among sensing signals input from the sensor layer 120 during the period in which the second mode is executed so as to be distinguished from a noise component (optical noise), and generate fingerprint information of the user, using the detected effective sensing signal. Accordingly, the reliability of fingerprint detection can be improved.

In some embodiments, various optical modulation methods may be used to modulate the lights L1 emitted from the fingerprint sensing area SA during the period in which the second mode is executed in a specific form. In an embodiment, the light L1 emitted from the fingerprint sensing area SA may be modulated using at least one of pulse amplitude modulation (PAM), pulse width modulation (PWM), pulse phase modulation (PPM), and pulse frequency modulation (PFM). That is, during the period in which the second mode is executed, the panel driving circuit 210 may generate a driving signal such that at least one of the amplitude (or intensity), pulse width, phase, and frequency of the lights L1 emitted from the pixels PXL of the fingerprint sensing area SA, and supply the generated driving signal to the display panel 110. A specific embodiment related to this will be described in detail later.

Figure 5A:
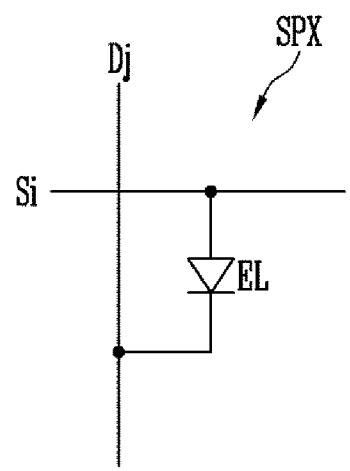
FIG. 5A is a schematic electrical diagram of a sub-pixel according to an embodiment of the present disclosure.
Figure 5B:
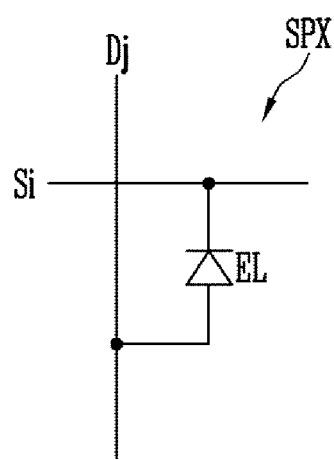
FIG. 5B is a schematic electrical diagram of a sub-pixel according to another embodiment of the present disclosure.

FIGS. 5A and 5B each illustrates a sub-pixel according to an embodiment of the present disclosure. For convenience, an arbitrary sub-pixel coupled to an ith (i is a natural number) horizontal line (horizontal pixel column) and jth (j is a natural number) vertical line (vertical pixel column) is illustrated in FIGS. 5A and 5B. In some embodiments, the sub-pixel of FIGS. 5A and 5B may be any one of the first to third sub-pixels described above, but is not limited to a specific sub-pixel. Meanwhile, the sub-pixel is a kind of pixel or a part thereof, and a structure and a driving method of the sub-pixel, which are described below, may be considered as those of the pixel.

Referring to FIGS. 5A and 5B, in some embodiments, each sub-pixel SPX includes a light emitting device EL coupled between a scan line Si and a data line Dj. In some embodiments, the light emitting device EL may be an organic light emitting diode (OLED), but the present disclosure is not limited thereto.

In some embodiments, as shown in FIG. 5A, a first electrode, e.g., an anode electrode of the light emitting device EL may be coupled to the scan line Si, and a second electrode, e.g., a cathode electrode of the light emitting device EL may be coupled to the data line Dj.

In some embodiments, the coupling direction of the organic light emitting device EL may be changed. For example, as shown in FIG. 5B, the anode electrode of the light emitting device EL may be coupled to the data line Dj, and the cathode electrode of the light emitting device EL may be coupled to the scan line Si.

The above-described sub-pixel SPX receives a scan signal and a data signal, which are respectively supplied from the scan line Si and the data line Dj, and emits light corresponding to the scan signal and the data signal. For example, when a forward voltage that is equal to or greater than a threshold voltage is applied between the first electrode and the second electrode, the light emitting device EL may emit light with a luminance corresponding to the magnitude of the applied voltage. That is, the emission of each sub-pixel SPX can be controlled by adjusting the voltage of the scan signal applied to the scan line Si and/or the data signal applied to the data line Dj.

Figure 6:
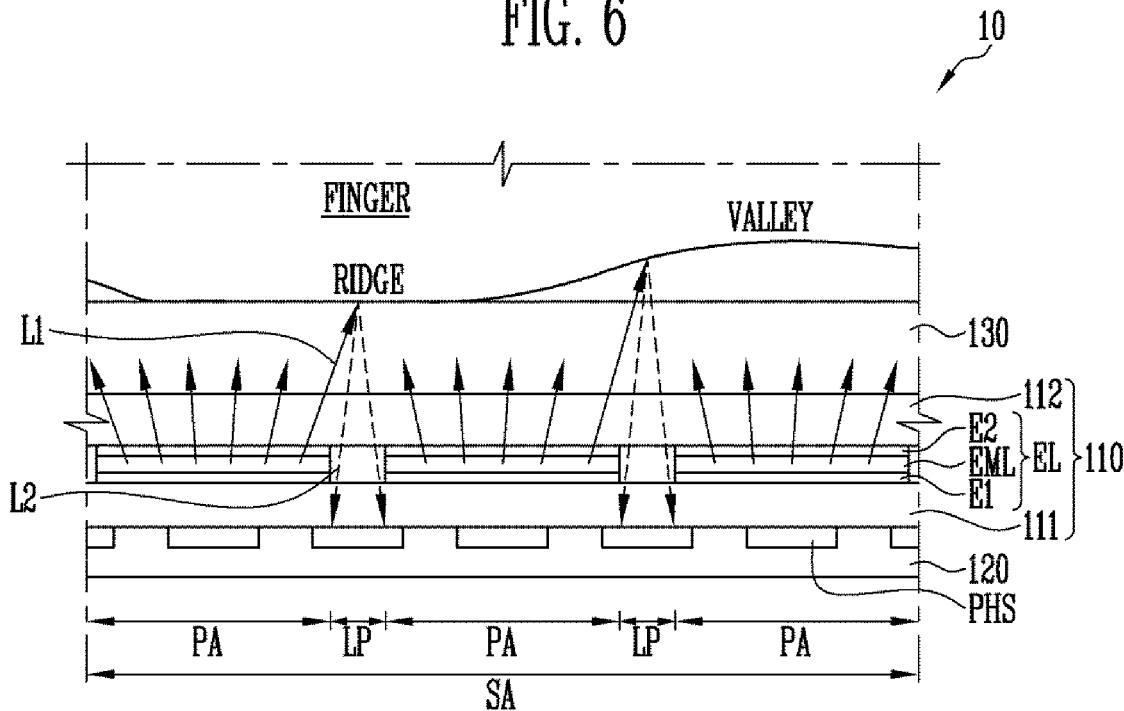
FIG. 6 is a cross-sectional side view of a fingerprint sensing area of a display device according to an embodiment of the present disclosure.

FIG. 6 illustrates a fingerprint sensing area of a display device according to an embodiment of the present disclosure. For convenience, a fingerprint sensing area of a display device including the sub-pixel of FIG. 5A or 5B is schematically illustrated in FIG. 6. In FIG. 6, components similar or identical to those of FIGS. 1 to 5B are designated by like reference numerals, and their detailed descriptions will be omitted.

Referring to FIG. 6, a display panel 110 may include a first substrate 111, a second substrate 112, and a plurality of light emitting devices EL provided therebetween. In some embodiments, the light emitting devices EL may be provided in unit pixel areas PA (e.g., pixel areas or sub-pixel areas), respectively.

In some embodiments, each of the first substrate 111 and the second substrate 112 may be a light transmissive substrate. In an embodiment, each of the first substrate 111 and the second substrate 112 may be a substrate made of a transparent or translucent material. In some embodiments, each of the first substrate 111 and the second substrate 112 may be a rigid or flexible substrate, and its material is not particularly limited. In some embodiments, at least one of the first substrate 111 and the second substrate 112 may configured with at least one insulating layer. In an embodiment, the second substrate 112 may be configured as a thin film encapsulation layer including one or more organic layers and one or more inorganic layers.

In some embodiments, each of the light emitting devices EL may include first and second electrodes E1 and E2 and an emitting layer EML provided between the first and second electrodes E1 and E2. In some embodiments, the first electrode E1 and the second electrode E2 may be coupled to a scan line Si and a data line Dj, respectively.

When the display device 10 according to the above-described embodiment is driven in the second mode, if a driving signal corresponding to a predetermined light pattern is supplied to the display panel 110, at least some light emitting devices EL provided in a fingerprint sensing area SA emit lights in a form corresponding to the driving signal. At this time, reflected lights L2 reflected from ridges and valleys of a fingerprint of a user among lights L1 emitted from the light emitting devices EL are modulated to different magnitudes (or amplitudes) and/or different phases, and accordingly, the fingerprint of the user can be detected.

In an embodiment, a sensing data voltage corresponding to a predetermined light pattern may be supplied to data lines Dj of sub-pixels SPX (or pixels PXL) of at least the fingerprint sensing area SA during the period in which the second mode is executed. For example, the panel driving circuit 210 may supply the sensing data voltage having a voltage level corresponding to the light pattern to the sub-pixels SPX while sequentially scanning the sub-pixels SPX of the fingerprint sensing area SA for every frame period during the period in which the second mode is executed. It should be noted that the term "frame period" is shorted to "frame" for brevity elsewhere herein.

In some embodiments, the sensing data voltage may be repeatedly changed plural times during the period in which the second mode is executed. In an embodiment, the voltage level of the sensing data voltage may be changed in a certain period, e.g., one frame period, during the period in which the display device 10 is driven in the second mode.

Accordingly, the fingerprint sensing area SA can emit light with an instantaneous luminance corresponding to the voltage level of the sensing data voltage for every frame period. Thus, as the sensing data voltage is changed, the amplitude of the lights L1 emitted from the fingerprint sensing area SA can be modulated during the period in which the second mode is executed. At this time, sensing signals are received from photo sensors PHS in units of horizontal lines along a direction identical to the scanning direction, and the pattern of the modulated lights L1 is compared with the received sensing signals, so that an effective sensing signal can be more easily detected.

Figure 7:
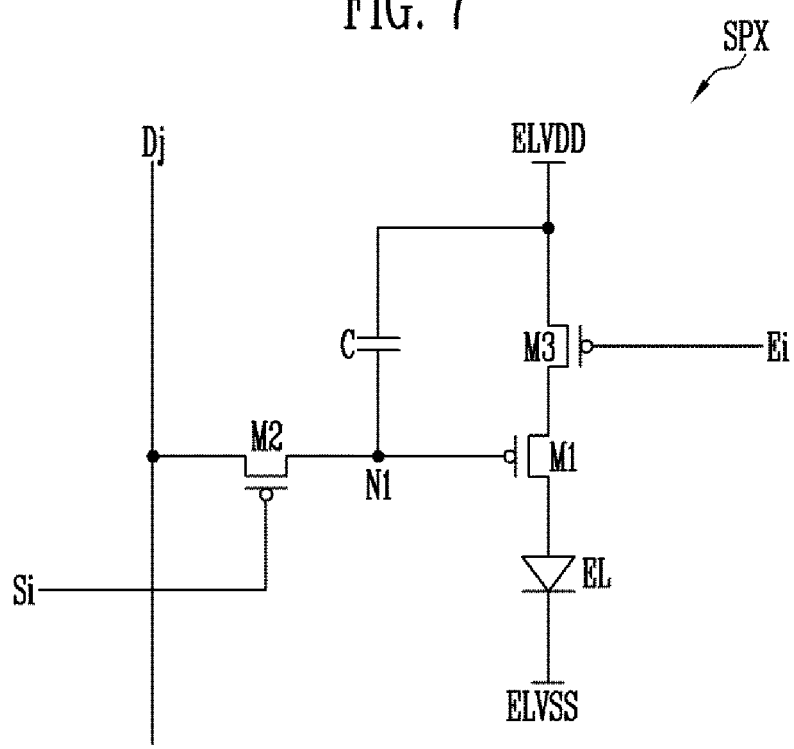
FIG. 7 is a schematic electrical diagram of a sub-pixel according to an embodiment of the present disclosure.
Figure 8:
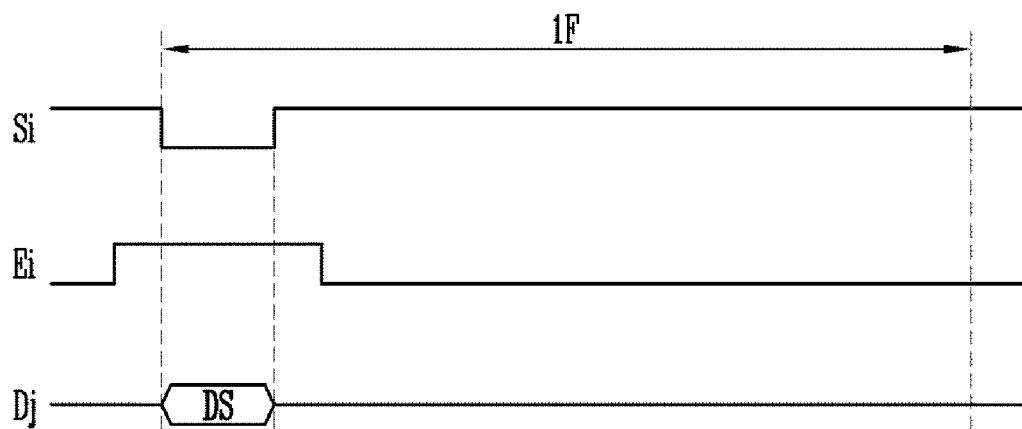
FIG. 8 shows waveforms of an embodiment of a driving method of the sub-pixel shown in FIG. 7.

FIG. 7 illustrates a sub-pixel according to an embodiment of the present disclosure. FIG. 8 illustrates an embodiment of a driving method of the sub-pixel shown in FIG. 7. The sub-pixel of FIG. 7 may be any one of the first to third sub-pixels described above, but is not limited to a specific sub-pixel.

Referring to FIG. 7, in some embodiments, each sub-pixel SPX (or pixel PXL) includes a light emitting device EL, first to third transistors M1, M2, and M3, and a capacitor C. In some embodiments, the light emitting device EL, the first to third transistors M1, M2, and M3, and the capacitor C may be provided in each unit pixel area PA between the first and second substrates 111 and 112 shown in FIG. 6.

In some embodiments, the light emitting device EL is coupled between a first power source ELVDD and a second power source ELVDD, to emit light, corresponding to a driving current supplied through the first transistor M1. The first power source ELVDD and the second power source ELVSS have voltage levels different from each other. In an embodiment, the second power source ELVSS may have a voltage level lower by a threshold voltage of the light emitting device EL than that of the first power source ELVDD.

The first transistor (driving transistor) M1 is coupled between the first power source ELVDD and the light emitting device EL. In addition, a gate electrode of the first transistor M1 is coupled to a first node N1. The first transistor M1 controls a driving current flowing through the light emitting device EL, corresponding to a voltage of the first node N1. In an embodiment, the first transistor M1 may control the supply and/or magnitude of the driving current, corresponding to the voltage of the first node N1.

The second transistor (switching transistor) M2 is coupled between a data line Dj and the first node N1. In addition, a gate electrode of the second transistor M2 is coupled to a scan line Si. The second transistor M2 is turned on when a scan signal is supplied to the scan line Si to allow the data line Dj and the first node N1 to be electrically coupled to each other. Thus, if the second transistor M2 is turned on, a data signal supplied to the data line Dj is transmitted to the first node N1.

The third transistor (emission control transistor) M3 is located on a current path of the driving current flowing through the light emitting device EL. In an embodiment, the third transistor M3 may be coupled between the first power source ELVDD and the first transistor M1. Alternatively, in another embodiment, the third transistor may be coupled between the first transistor M1 and the light emitting device EL. In addition, a gate electrode of the third transistor M3 is coupled to a first control line Ei (e.g., an emission control line).

In some embodiments, a first control signal (e.g., an emission control signal) for controlling an emission state or an emission timing (e.g., an emission time point and/or emission duration time) of each sub-pixel SPX, corresponding to the first mode and/or the second mode, may be supplied to the first control line Ei. Specifically, the third transistor M3 is turned off when the first control signal having a gate-off voltage is supplied to the first control line Ei to block the current path of the driving current from being formed in the sub-pixel SPX. Also, the third transistor M3 is turned on when the first control signal having a gate-on voltage is supplied to the first control line Ei to allow the current path to be formed.

The capacitor C is coupled between the first power source ELVDD and the first node N1. The capacitor C stores a voltage corresponding to the data signal supplied to the first node N1, and maintains the stored voltage until a data signal of a next frame is supplied.

Referring to FIG. 8, the scan signal is supplied to the scan line Si during each frame period. In an embodiment, the scan signal having the gate-on voltage (e.g., a low voltage) may be sequentially supplied to the scan line Si of each horizontal line (horizontal pixel row) during one frame period 1F. That is, in some embodiments, the scan signal may be supplied in a horizontal period corresponding to a corresponding sub-pixel during one frame period 1F.

If the scan signal is supplied to the scan line Si, the second transistor M2 is turned on. Accordingly, as the data line Dj and the first node N1 are electrically coupled to each other, a data signal DS from the data line Dj is supplied to the first node N1. At this time, the capacitor C stores a voltage corresponding to the data signal DS, e.g., a voltage corresponding to a difference between the voltage of the first power source ELVDD and the data signal DS.

In some embodiments, the first control signal having the gate-off voltage (e.g., a "high" voltage state) may be supplied to the first control line Ei during a period in which at least the scan signal is supplied. If the first control signal having the gate-off voltage is supplied to the first control line Ei, the third transistor M3 may be maintained in an off-state. Accordingly, a voltage of the data signal DS is stably stored in the capacitor C, and it is possible to prevent the sub-pixel SPX from emitting light with an unwanted luminance during the period in which the data signal DS is stored.

After a voltage corresponding to the data signal DS is stored in the capacitor C, the supply of the scan signal is stopped. Accordingly, the second transistor M2 is turned off.

After that, if the first control signal having the gate-on voltage (e.g., a low voltage) is supplied to the first control line Ei, the current path of the driving current is formed as the third transistor M3 is turned. At this time, the first transistor M1 controls the amount of current flowing from the first power source ELVDD to the second power source ELVSS via the light emitting device EL, corresponding to the voltage of the first node N1. Then, the light emitting device EL generates light with a luminance corresponding to the driving current. Meanwhile, if the data signal DS corresponding to a black gray level is supplied to the first node N1, the first transistor M1 does not supply the driving current to the light emitting device EL. In this case, the light emitting device EL does not emit light to display the block gray level.

Meanwhile, in the embodiment of the present disclosure, the circuit structure of the sub-pixel SPX (or pixel PXL) is not limited by the embodiment shown in FIG. 7. In an embodiment, the sub-pixel SPX may include various types of pixel circuits currently known in the art.

When the display device 10 including the sub-pixel SPX (or pixel PXL) according to the above-described embodiment is driven in the second mode, the panel driving circuit 210 may supply a driving signal corresponding to a predetermined light pattern to the display panel 110. Accordingly, at least some light emitting devices EL provided in the fingerprint sensing area SA emit lights in a form corresponding to the driving signal.

In an embodiment, the panel driving circuit 210 may supply a sensing data voltage corresponding to a predetermined light pattern to data lines Dj of sub-pixels SPX (or pixels PXL) of the fingerprint sensing area SA while sequentially scanning the sub-pixels SPX during the period in which the second mode is executed. In this case, as the sensing data voltage is repeatedly changed plural times during the period in which the second mode is executed, the amplitude of the lights L1 emitted from the fingerprint sensing area SA may be modulated.

In some embodiments, sensing signals may be sequentially received from photo sensors PHS corresponding to the sub-pixels SPX of the fingerprint sensing area SA while allowing the sub-pixels SPX in units of horizontal lines along a direction identical to the scanning direction. Alternatively, as the on/off of the third transistor M3 is controlled using the first control signal, the entire fingerprint sensing area SA may be sensed at the same timing after lights are simultaneously emitted from the sub-pixels SPX of at least the fingerprint sensing area SA. For example, the sub-pixels SPX may be sequentially scanned while simultaneously supplying the first control signal having the gate-off voltage to the sub-pixels SPX of the fingerprint sensing area SA during a predetermined scanning period in one frame period IF. In addition, the first control signal having the gate-on voltage is simultaneously supplied to the sub-pixels SPX during a predetermined emission period subsequent to the scanning period, so that lights can be simultaneously emitted from the sub-pixels SPX of at least the fingerprint sensing area SA.

Meanwhile, as the first control signal is controlled in addition to the sensing data voltage, the pattern of the lights L1 emitted from the fingerprint sensing area SA may be controlled. In an embodiment, the voltage level and/or supply timing of the first control signal may be controlled such that lights L1 corresponding to a predetermined light pattern are emitted from the fingerprint sensing area SA. In some embodiments, the voltage level of the first control signal may be changed for every certain time, e.g., for every frame. As the first control signal is controlled as described above, the pulse width, phase, and/or frequency of the lights L1 emitted from the fingerprint sensing area SA can be modulated.

That is, according to the embodiment of the present disclosure, as at least one of the sensing data voltage and the first control signal is controlled, the pulse width, phase, and/or frequency of the lights L1 emitted from the fingerprint sensing area SA can be modulated. Accordingly, an effective sensing signal can be easily detected from the sensing signals received from the photo sensors PHS.

Figure 9:
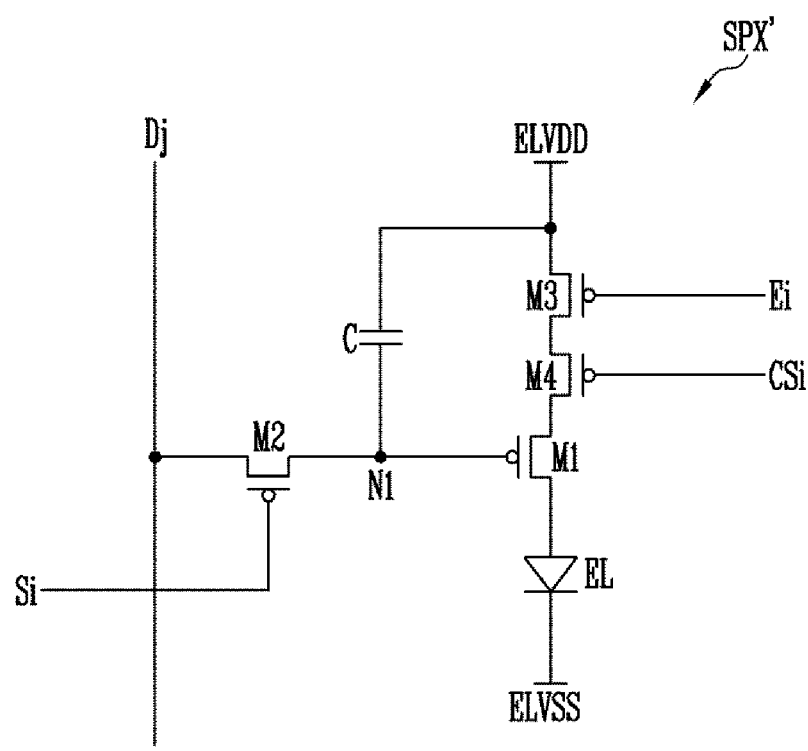
FIG. 9 is a schematic electrical diagram of a sub-pixel according to another embodiment of the present disclosure.

FIG. 9 illustrates a sub-pixel according to an embodiment of the present disclosure. In FIG. 9, components similar or identical to those of FIG. 7 are designated by like reference numerals, and their detailed descriptions will be omitted.

Referring to FIG. 9, in some embodiments, a sub-pixel SPX' may further include a fourth transistor (emission control transistor for fingerprint sensing) M4 provided on the current path along which the driving current flows through the light emitting device EL. In some embodiments, the fourth transistor M4 may be coupled in series to the third transistor M3 between the first power source ELVDD and the first transistor M1. In an embodiment, the fourth transistor M4 may be coupled between the first transistor M1 and the third transistor M3. In addition, a gate electrode of the fourth transistor M4 may be coupled to a second control line CSi.

In some embodiments, a second control signal (e.g., an emission control signal for fingerprint sensing) for controlling an emission state or an emission timing (e.g., an emission time point and/or an emission duration time) of each sub-pixel SPX', corresponding to the first mode and/or the second mode, may be supplied to the second control line CSi. Specifically, the fourth transistor M4 is turned off when the second control signal having the gate-off voltage is supplied to the second control line CSi to block the current path of the driving current from being formed in the sub-pixel SPX'. Also, the fourth transistor M4 is turned on when the second control signal having the gate-on voltage is supplied to the second control line CSi to allow the is current path of the driving current to be formed.

In some embodiments, sub-pixels SPX' (or pixels PXL configured with the sub-pixels SPX') provided in the fingerprint sensing area SA may be simultaneously supplied with the same second control signal. In an embodiment, second control lines CSi coupled to the sub-pixels SPX' of the fingerprint sensing area SA may be electrically coupled to each other, and the second control signal may be simultaneously supplied to the sub-pixels SPX' of the fingerprint sensing area SA during a period in which the display device 10 is driven in the first and second modes. Accordingly, the luminance of the fingerprint sensing area SA can be easily controlled using one second control signal.

In some embodiments, the second control signal having the gate-on voltage may be continuously supplied to the second control line CSi during a period in which the display device 10 is driven in the first mode. Then, during the period in which the first mode is executed, the sub-pixels SPX' of the fingerprint sensing area SA may be driven together with sub-pixels of the remaining area, e.g., the sub-pixels SPX having the structure shown in FIG. 7.

Meanwhile, the voltage level of the second control signal supplied to the second control line CSi may be repeatedly changed during a period in which the display device 10 is driven in the second mode. In an embodiment, the second control signal having the gate-on voltage and the second control signal having the gate-off voltage may be alternately supplied to the second control line CSi during the period in which the display device 10 is driven in the second mode. For example, the second control signal may have the gate-on voltage that allows the fourth transistor M4 to be turned on during a first period in the period in which the second mode is executed, and have the gate-off voltage that allows the fourth transistor M4 to be turned off during a second period subsequent to the first period. In some embodiments, the first period and the second period may have the same durations, but the present disclosure is not limited thereto. For example, durations (or continuous times) of the first period and the second period may be set different from each other. In some embodiments, the voltage level of the second control signal may be changed in a predetermined period during the period in which the second mode is executed, but the present disclosure is not limited thereto. In an embodiment, the voltage level of the second control signal may be changed for every frame period in the period in which the second mode is executed.

In some embodiments, the gate-on voltage that allows the fourth transistor M4 to be turned on may include a plurality of voltage levels that allow the fourth transistor M4 to be turned on to different degrees. In an embodiment, the gate-on voltage may include a first gate-on voltage that allows the fourth transistor M4 to be completely (or fully) turned on, and one or more second gate-on voltages that allows the fourth transistor M4 to be weakly turned on. In this case, during the period in which the second mode is executed, the voltage level of the second control signal may be repeatedly changed plural times from any one of at least three voltage levels including the first gate-on voltage, the second gate-on voltage, and the gate-off voltage to another of the at least three voltage levels. In some embodiments, if the second control signal having the second gate-on voltage is supplied to the second control line CSi, sub-pixels SPX' supplied with the second control signal may emit light at a middle gray level between a black gray level and a white gray level. If the middle gray level is applied as described above, the pattern of the lights L1 emitted from the fingerprint sensing area SA can be changed in various forms.

In the above-described embodiment, the sub-pixels SPX' (or pixels PXL configured with the sub-pixels SPX') provided in the fingerprint sensing area SA may emit light with a luminance changed corresponding to the voltage level of the second control signal. That is, in some embodiments, the fingerprint sensing area SA emits light with a luminance corresponding to the voltage level of the second signal during the period in which the second mode is executed, and may emit light with a luminance changed as the voltage level of the second control signal is repeatedly changed. In an embodiment, when the display device 10 is driven in the second mode, the luminance of the second sensing area SA may be changed corresponding to a predetermined light pattern.

In some embodiments, the display device 10 may include the fourth transistor M4 in each sub-pixel SPX' in at least the fingerprint sensing area SA. In an embodiment, the display device 10 may include the fourth transistor M4 in only each of the sub-pixels SPX' of the fingerprint sensing area SA. However, the present disclosure is not limited thereto. For example, in another embodiment, the display device 10 may include the fourth transistor M4 in each sub-pixel SPX of the remaining display area AA except the fingerprint sensing area SA, so that all of the sub-pixels SPX and SPX' (or pixels PXL) of the display area AA can have the substantially same structure. Accordingly, the image quality of the display device 10 can be equalized.

When the fourth transistor M4 is provided in each of the sub-pixels SPX of the remaining display area AA except the fingerprint sensing area SA, the second control signal having the gate-on voltage may be continuously supplied to the fourth transistors M4 of the remaining display area AA. To this end, a second control line CSi for supplying the second control signal to each of the sub-pixels SPX' of the fingerprint sensing area SA and a second control line CSi for supplying the second control signal to each of the sub-pixels SPX of the remaining display area AA may be separated from each other. In addition, the panel driving circuit 210 may continuously supply the second control signal having the gate-on voltage to the second control line CSi coupled to each of the sub-pixels SPX of the remaining display area AA.

In some embodiments, during the period in which the second mode is executed, the first control signal may be supplied to allow the third transistors M3 of the sub-pixels SPX' provided in the fingerprint sensing area SA to be maximally turned on, and the second control signal may be supplied to allow the fourth transistors M4 of the sub-pixels SPX' to be repeatedly turned off. In an embodiment, the voltage level of the first signal may be set such that the third transistor M3 of a corresponding sub-pixel SPX' is turned off during only a period in which the scan signal is supplied to the sub-pixel SPX' in the period in which the second mode is executed, and the third transistor M3 of the sub-pixel SPX' maintains a turn-on state in other periods. In addition, the voltage level of the second control signal may be set such that light corresponding to a predetermined light pattern can be emitted in the fingerprint sensing area SA during the period in which the second mode is executed.

That is, the pattern (waveform, etc.) and/or luminance of the lights L1 emitted from the fingerprint sensing area SA can be controlled using the second control signal during the period in which the second mode is executed. Thus, as the supply timing and voltage level of the second control signal is controlled, the lights L1 emitted from the fingerprint sensing area SA can be modulated in a predetermined pattern. In an embodiment, the pulse width, phase, and/or frequency of the lights L1 emitted from the fingerprint sensing area SA may be modulated using the second control signal.

In the above-described embodiment, as the voltage level of a sensing data voltage supplied to the sub-pixels SPX' provided in the fingerprint sensing area SA is repeatedly changed during the period in which the second mode is executed, the amplitude of the lights L1 emitted from the fingerprint sensing area SA can be modulated.

That is, according to the above-described embodiment, as at least one of the sensing data voltage and the second control signal is controlled, the amplitude, pulse width, phase, and/or frequency of the lights L1 emitted from the fingerprint sensing area SA can be modulated.

Figure 10:
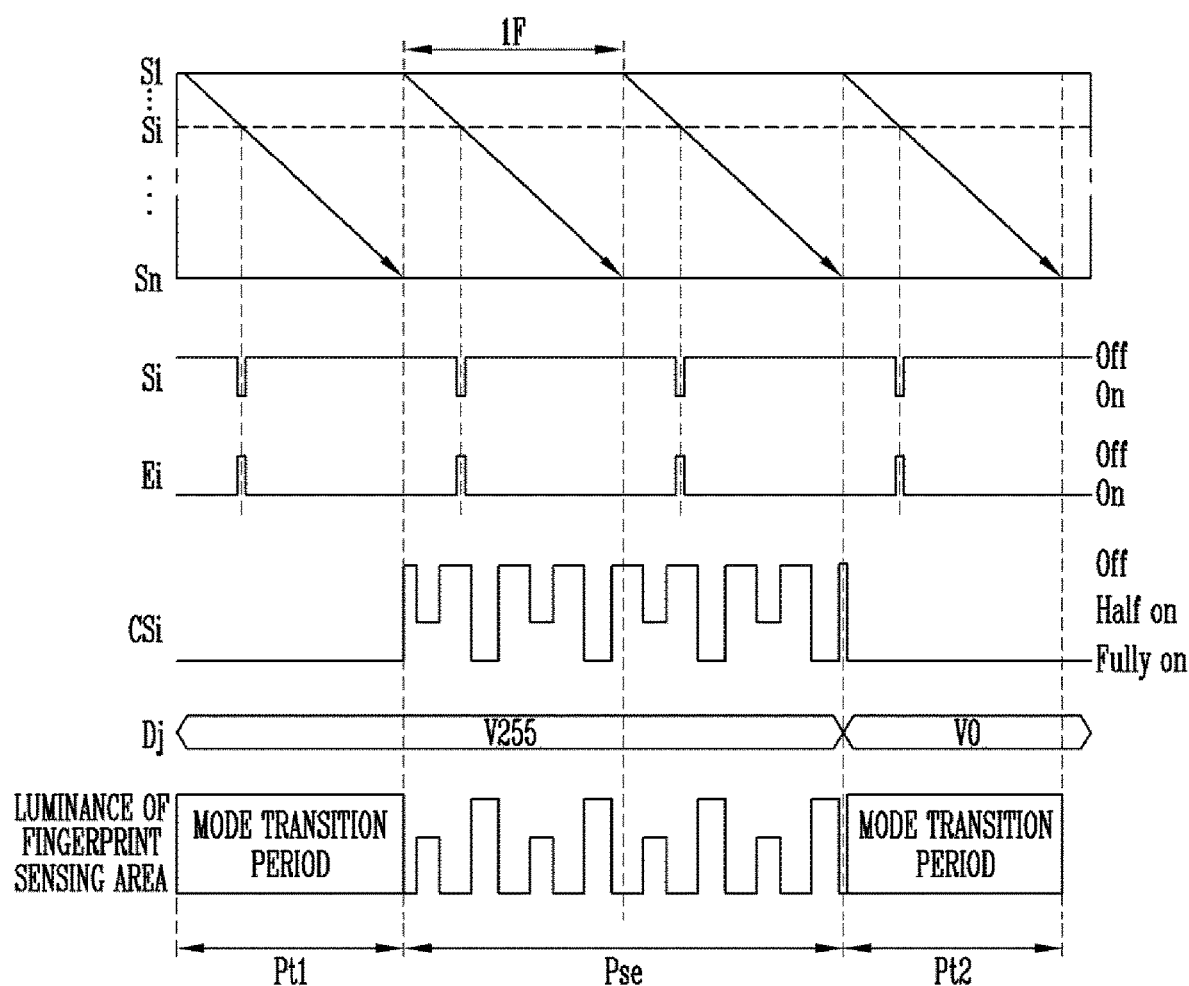
FIG. 10 shows waveforms of an embodiment of a driving method when a display device according to an embodiment of the present disclosure is driven in a second mode.

FIG. 10 illustrates an embodiment of a driving method when a display device according to an embodiment of the present disclosure is driven in the second mode. In an embodiment, FIG. 10 illustrates an embodiment of a driving method when a display device including pixels configured as shown in FIG. 9 is driven in the second mode in at least the fingerprint sensing area.

Referring to FIG. 10, in some embodiments, the panel driving circuit 210 may supply a sensing data voltage of a predetermined gray level to each data line Dj while sequentially scanning scan lines S1 to Sn provided in at least the fingerprint sensing area SA during a second mode period Pse and mode transition periods Pt1 and Pt2 disposed prior to and posterior to the second mode period Pse. In an embodiment, the panel driving circuit 210 may supply a voltage (V255) corresponding to a white gray scale to each data line Dj while sequentially supplying the scan signal having the gate-on voltage to the scan lines S1 to Sn during at least the second mode period Pse. Also, the panel driving circuit 210 may supply the first control signal having the gate-off voltage to each first control line Ei to be synchronized with the scan signal at a point of time when the scan signal is supplied to each scan line Si, and otherwise supply the first control signal having the gate-on voltage to each first control line Ei. Meanwhile, in some embodiments, the panel driving circuit 210 supplies a voltage (V0) corresponding to a black gray scale to each data line Dj just after the second mode period Pse is ended, so that it is possible to prevent the fingerprint sensing area SA from emitting light with an unwanted luminance.

In some embodiments, the panel driving circuit 210 may simultaneously supply the same second control signal to the second control lines CSi of the sub-pixels SPX provided in the fingerprint sensing area SA during the second mode period Pse. In this case, the panel driving circuit 210 may repeatedly change the voltage level of a second control signal supplied to the fingerprint sensing area SA during each frame period. In an embodiment, as shown in FIG. 10, the voltage level of the second control signal may be changed a few times in three stages between the gate-off voltage and the gate-on voltage during one frame period 1F. In this case, the amplitude of the lights L1 emitted from the fingerprint sensing area SA may also be changed.

In some embodiments, the voltage level of the second control signal may be changed for every certain time. Accordingly, the fingerprint sensing area SA can emit light with a luminance changed corresponding to the voltage level of the second control signal. In an embodiment, the voltage level of the second control signal may be repeatedly changed even during one frame period 1F. In this case, the fingerprint sensing area SA may emit light with an instantaneous luminance corresponding to the voltage level of the second control signal.

According to the above-described embodiment, as the second control signal supplied to the second control line CSi is controlled, the instantaneous luminance, emission state, and/or emission timing of the sub-pixels SPX of the fingerprint sensing area SA can be repeatedly changed during the period in which the display device 10 is driven in the second mode. Accordingly, the pattern of the lights L1 emitted from the fingerprint sensing area SA can be variously modulated.

Figure 11A:
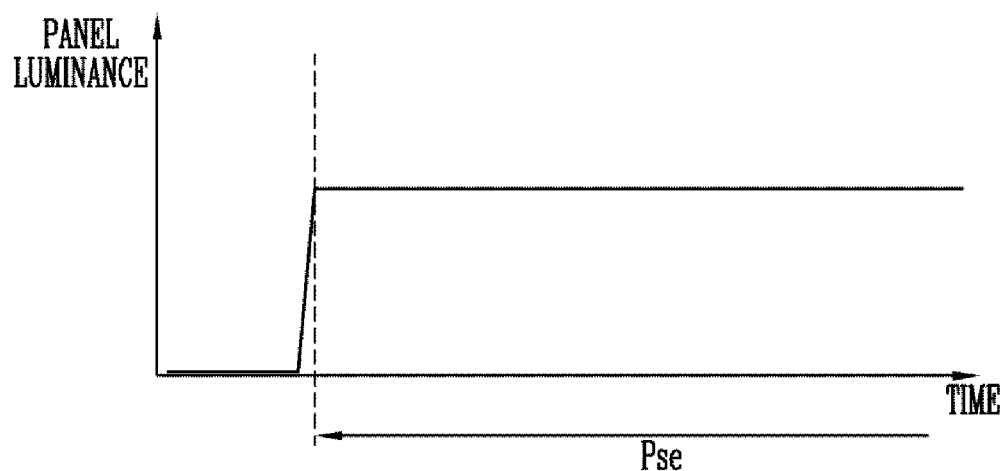
FIG. 11A is a graph of panel luminance when a display device according to a comparative example is driven in the second mode.
Figure 11B:
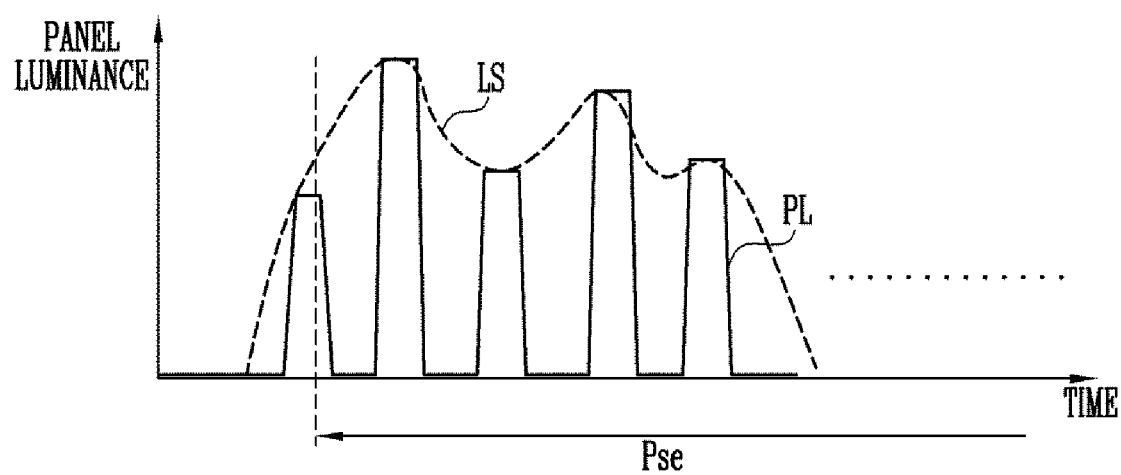
FIG. 11B is a graph of panel luminance when the display device according to the embodiment of the present disclosure is driven in the second mode, and of a waveform of a light signal output from a display panel, corresponding to the panel luminance.

FIG. 11A illustrates panel luminance when a display device according to a comparative example is driven in the second mode. FIG. 11B illustrates panel luminance when the display device according to the embodiment of the present disclosure is driven in the second mode, and waveform of a light signal output from the display panel, corresponding to the panel luminance. For convenience, FIGS. 11A and 11B illustrate panel luminance of the fingerprint sensing area.

Referring to FIG. 11A, the display device according to the comparative example emits light with a constant luminance through a display panel during the second mode period Pse. On the other hand, referring to FIG. 11B, the display device 10 according to the embodiment of the present disclosure emits light with a luminance PL changed for every predetermined period through the display panel 110 during the second mode period Pse. For example, the display device 10 according to the embodiment of the present disclosure may emit light as the luminance PL is changed plural times during one period in the second mode period Pse, and emit light with the luminance PL repeatedly changed in the same pattern as the one period.

Accordingly, the display panel 110 may output a light signal LS having a specific waveform that has a predetermined period corresponding to a change of the luminance PL. In an embodiment, the display panel 110 may output a light signal LS of which signal level is changed corresponding to a change of the luminance PL of the fingerprint sensing area SA. That is, in the display device 10 according to the embodiment of the present disclosure, the light signal LS emitted from the fingerprint sensing area SA may be modulated to have a predetermined pattern, and the light pattern may be repeated according to a predetermined period.

In some embodiments, in order to modulate the light signal LS emitted from the fingerprint sensing area SA, the panel driving circuit 210 may control a driving signal supplied to the display panel 110, corresponding to a predetermined light pattern. In an embodiment, during the second mode period Pse, the panel driving circuit 210 may generate at least one of the sensing data voltage, the first control signal, and the second control signal, which are supplied to the sub-pixels SPX and SPX' (or pixels PXL) of the fingerprint sensing area SA, to correspond to the predetermined light pattern, and supply the at least one of the sensing data voltage, the first control signal, and the second control signal to the display panel 110.

A portion of the light signal LS emitted from the display panel 110 during the second mode period Pse may be reflected from a finger (e.g., a fingerprint) of a user, and the reflected light may be incident into photo sensors PHS. That is, the light signal LS emitted from the display panel 110 during the second mode period Pse may be used as an input signal for fingerprint detection.

Figure 12A:
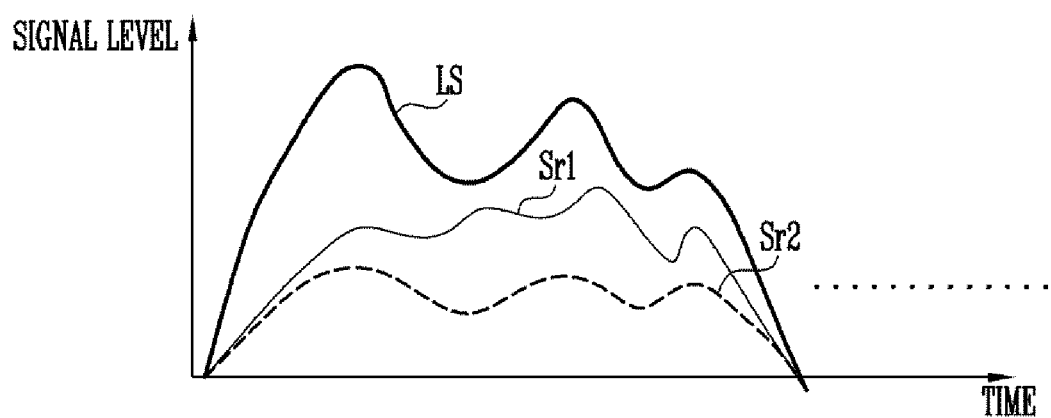
FIG. 12A and FIG. 12B are graphs of a light signal incident into a fingerprint and reflected signals reflected from the fingerprint when the display device according to the embodiment of the present disclosure is driven in the second mode.
Figure 12B:
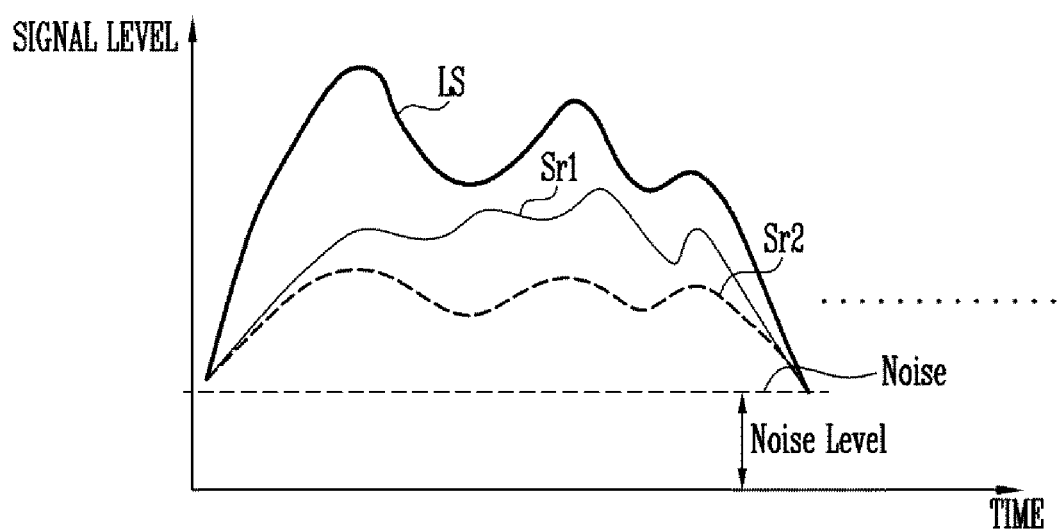

FIGS. 12A and 12B illustrate an embodiment of a light signal incident into a fingerprint and reflected signals reflected from the fingerprint when the display device according to the embodiment of the present disclosure is driven in the second mode. For convenience, FIGS. 12A and 12B illustrate a light signal emitted from the fingerprint sensing area and reflected signals corresponding to the light signal.

Referring to FIG. 12A, if a light signal LS having a predetermined light pattern is emitted from the fingerprint sensing area SA to be reflected from a fingerprint, different reflection forms are represented at ridges and valleys of the fingerprint. In an embodiment, first and second reflected signals Sr1 and Sr2 respectively reflected from the ridge and valley of the fingerprint have a waveform corresponding to the light signal LS, and may have different magnitudes (or levels) and/or different phases. For example, a magnitude of the first reflected signal Sr1 reflected from the ridge of the fingerprint may be larger than that of the second reflected signal Sr2 reflected from the valley of the fingerprint. That is, sensing signals input from photo sensors PHS to the fingerprint detecting circuit 220 during the second mode period Pse may include a first sensing signal corresponding to the first reflected signal Sr1 and a second sensing signal corresponding to the second reflected signal Sr2. In addition, both of the first sensing signal and the second sensing signal have a waveform corresponding to the light pattern of the light signal LS, and the waveforms may have different magnitudes and phases. Thus, a magnitude difference, etc. between the first and second reflected signals Sr1 and Sr2 is detected based on the first and second sensing signals, so that the shape of the fingerprint can be detected. Accordingly, fingerprint information of the user can be generated.

Referring to FIG. 12B, light noise may be generated due to light scattering in the display panel 110 or introduction of external line. Therefore, light noise (noise component) may be included in at least one of the light signal LS and the first and second reflected signals Sr1 and Sr2. In an embodiment, the signal level of the light signal LS, the first reflected signal Sr1, and/or the second reflected signal Sr2 may be changed corresponding to the light noise. Alternatively, at least some photo sensors PHS into which reflected light from the fingerprint is not incident may receive light noise, and output sensing signals corresponding to the light noise. The sensing signals corresponding to the light noise may have a waveform unrelated to the emission form of the pixels PXL provided in the fingerprint sensing area SA.

However, as described above, the display device 10 according to the embodiment of the present disclosure controls the luminance of the fingerprint sensing area SA, corresponding to a predetermined light pattern during the second mode period Pse. Thus, the fingerprint detecting circuit 220 can distinguish an effective component (effective sensing signal) including first and second sensing signals among the sensing signals received from the photo sensors PHS from a noise component except the effective component, and detect the shape of the fingerprint, based on the first and second sensing signals.

Figure 13A:
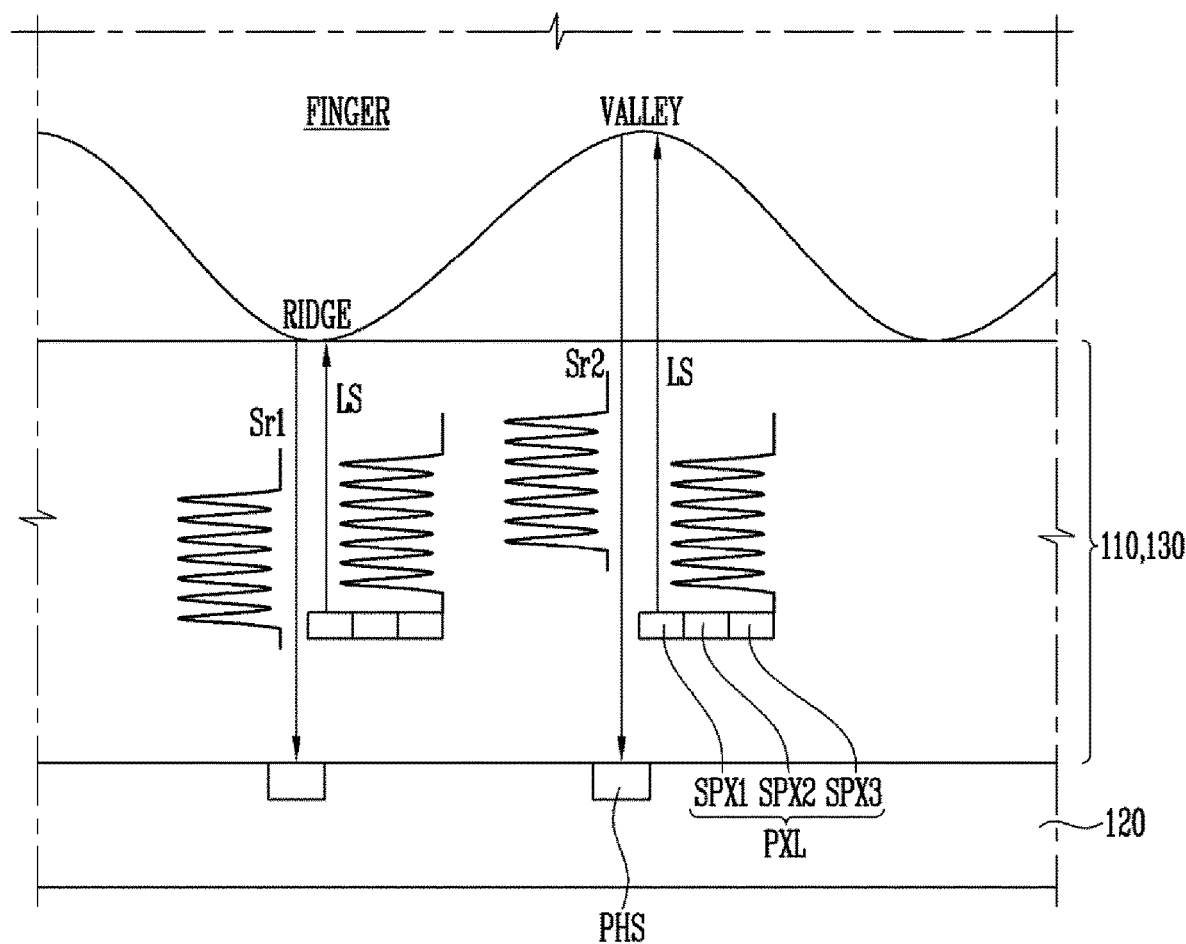
FIG. 13A is a schematic diagram of a fingerprint sensing method according to an embodiment of the present disclosure.
Figure 13B:
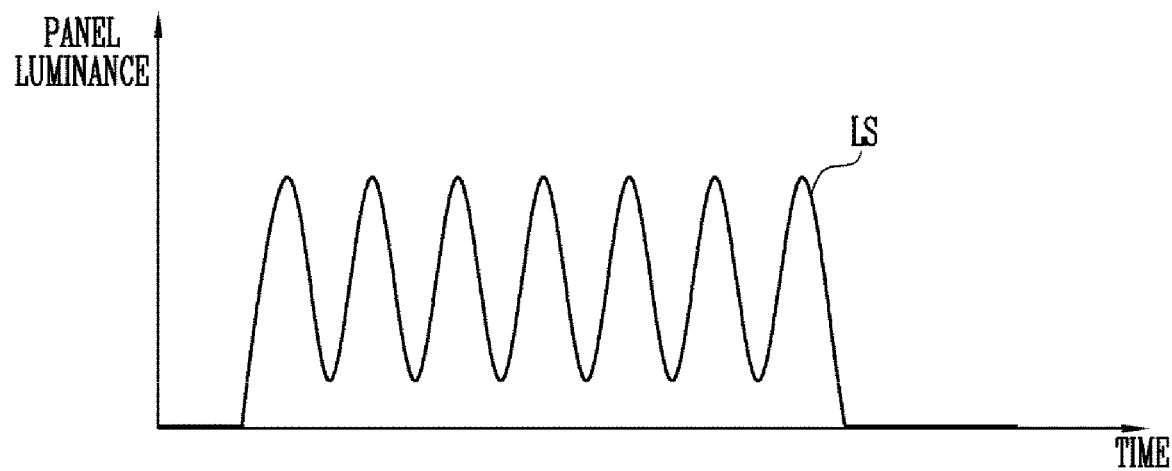
FIG. 13B and FIG. 13C are graphs of panel luminance over time in a fingerprint method according to an embodiment of the present disclosure.
Figure 13C:
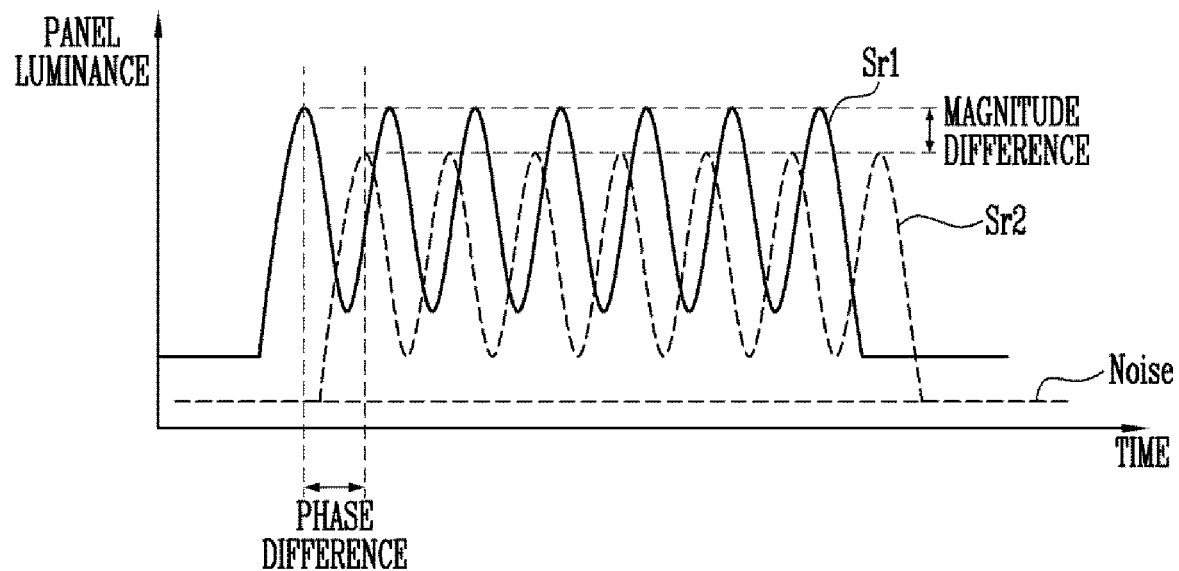

FIGS. 13A to 13C illustrate a fingerprint sensing method according to an embodiment of the present disclosure. In FIGS. 13A to 13C, detailed descriptions of portions similar or identical to those of the above-described embodiment will be omitted.

Referring to FIGS. 13A to 13C, a fingerprint of a user may be detected using a light signal LS having a predetermined period. Specifically, when a light signal LS having a predetermined period is emitted using pixels PXL provided in the fingerprint sensing area SA, if at least one portion of the light signal LS is reflected from the fingerprint, different reflection forms are represented at ridges and valleys of the fingerprint. For example, first and second reflected signals Sr1 and Sr2 respectively reflected from the ridge and valley of the fingerprint have differences in their magnitudes (signal levels) and phases. Thus, the shape of the fingerprint can be detected by detecting a magnitude difference between the first and second reflected signals Sr1 and Sr2 and/or a phase difference between the first and second reflected signals Sr1 and Sr2, and fingerprint information of the user can be generated corresponding to the shape of the fingerprint.

Meanwhile, in addition to the above-described method, the shape of the fingerprint may be detected using PFM or the like. In an embodiment, the ridge and valley of the fingerprint may be distinguished from each other by emitting a light signal LS of which frequency is continuously changed toward the fingerprint and detecting a frequency difference between sensing signals output from photo sensors PHS.

According to the present disclosure, a fingerprint of a user is detected using lights emitted from pixels, so that a fingerprint sensor can be implemented without any separate external light source.

Further, according to the present disclosure, the emission of pixels is controlled corresponding to a predetermined light pattern during a fingerprint sensing period, and a fingerprint of a user is detected based on a sensing signal (effective sensing signal) corresponding to the light pattern among sensing signals received from photo sensors. Accordingly, a malfunction caused by light noise can be reduced, and the reliability of fingerprint recognition can be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:
    a display panel comprising a display area comprising a fingerprint sensing area and a plurality of pixels provided in the fingerprint sensing area;
    a sensor layer disposed on one surface of the display panel overlapping the fingerprint sensing area, the sensor layer comprising a plurality of photo sensors;
    a panel driving circuit configured to output a data signal corresponding to image data to the display panel, corresponding to a first mode, and to output a driving signal to the display panel to allow the pixels to emit lights in a form corresponding to a predetermined light pattern, corresponding to a second mode; and
    a fingerprint detecting circuit configured to receive sensing signals from the photo sensors, corresponding to the second mode, the fingerprint detecting circuit detecting a fingerprint of a user, based on a sensing signal corresponding to the light pattern among the received sensing signals,
    wherein:
    the sensing signal comprises first and second sensing signals having a waveform corresponding to the light pattern but having different magnitudes and different phases; and
    the fingerprint detecting circuit is configured to detect a shape of the fingerprint, based on the first and second sensing signals.

2. The display device of claim 1, wherein the panel driving circuit is configured to generate the driving signal such that at least one of amplitude, pulse width, phase, and frequency of lights emitted from the pixels is changed during a period in which the display device is driven in the second mode.

3. The display device of claim 1, wherein the driving signal is a sensing data voltage having a voltage level changed depending on a certain period when the display device is driven in the second mode, the sensing data voltage being supplied to data lines coupled to the pixels.

4. The display device of claim 3, wherein the certain period is set to one frame.

5. The display device of claim 3, wherein the panel driving circuit is configured to supply the driving signal to the pixels while sequentially scanning the pixels provided in the fingerprint sensing area during each frame in the certain period when the display device is driven in the second mode.

6. The display device of claim 5, wherein the pixels provided in the fingerprint sensing area are configured to sequentially emit lights according to a scanning sequence thereof during each frame, or simultaneously emit lights during a predetermined emission period in the frame.

7. The display device of claim 1, wherein each of the pixels comprises a light emitting device, and a transistor located on a current path along which driving current flows through the light emitting device, the transistor being turned on corresponding to the driving signal.

8. The display device of claim 7, wherein the transistor is repeatedly turned on and turned off during the certain period when the display device is driven in the second mode.

9. The display device of claim 7, wherein the driving signal has a voltage level changed during the certain period when the display device is driven in the second mode.

10. The display device of claim 7, wherein the driving signal has a gate-on voltage that allows the transistor to be turned on during a first period in the certain period when the display device is driven in the second mode, and a gate-off voltage that allows the transistor to be turned off during a second period subsequent to the first period.

11. The display device of claim 10, wherein the gate-on voltage includes a plurality of voltage levels that allow the transistor to be turned on to different degrees.

12. The display device of claim 7, wherein a voltage level of the driving signal is changed plural times during each frame in the certain period when the display device is driven in the second mode.

13. The display device of claim 1, wherein each of the pixels comprises:
- a light emitting device coupled between a first power source and a second power source;
- a first transistor coupled between the first power source and the light emitting device, the first transistor comprising a first gate electrode coupled to a first node;
- a second transistor coupled between the first node and a data line, the second transistor comprising a second gate electrode coupled to a scan line;
- third and fourth transistors coupled in series between the first power source and the first transistor, the third and fourth transistors comprising third and fourth gate electrodes respectively coupled to a first control line and a second control line; and
- a capacitor coupled between the first node and the first power source.

14. The display device of claim 13, wherein the panel driving circuit is configured to supply the same sensing data voltage to the pixels while sequentially supplying a scan signal having a gate-on voltage and a first control signal having a gate-off voltage respectively to the scan line and the first control line on each of horizontal lines provided in the fingerprint sensing area during each frame in the certain period when the display device is driven in the second mode.

15. The display device of claim 14, wherein the panel driving circuit is configured to simultaneously supply the same second control signal to the second control lines of the pixels during each frame in the certain period when the display device is driven in the second mode, and
- wherein a voltage level of the second control signal is repeatedly changed to the gate-on voltage or the gate-off voltage during each frame.

16. The display device of claim 13, wherein the display panel further comprises a plurality of pixels provided in the remaining display area except the fingerprint sensing area, each of the plurality of pixels having the same structure as each of the pixels provided in the fingerprint sensing area,
- wherein the panel driving circuit is configured to continuously supply a second control signal having the gate-on voltage to plural instances of the second control line coupled to the pixels of the remaining display area.

17. The display device of claim 1, wherein, during the certain period when the display device is driven in the second mode, a voltage level of the driving signal is repeatedly changed corresponding to the light pattern, and a luminance of the pixels is changed corresponding to the voltage level of the driving signal.

18. A method of driving a display device that comprises a display panel comprising a fingerprint sensing area in which a plurality of pixels are provided and a plurality of photo sensors provided on one surface of the display panel overlapping the fingerprint sensing area, the method comprising:
- outputting a data signal corresponding to image data to the display panel, corresponding to a first mode; and
- receiving sensing signals from the photo sensors while supplying a driving signal corresponding to a predetermined light pattern to the display panel, corresponding to a second mode, and detecting a fingerprint of a user, based on a sensing signal corresponding to the light pattern among the received sensing signals,
wherein:
- the sensing signal comprises first and second sensing signals having a waveform corresponding to the light pattern but having different magnitudes and different phases; and
- a shape of the fingerprint is detected based on the first and second sensing signals during a period in which the display device is driven in the second mode.

19. The method of claim 18, wherein the driving signal is generated such that at least one of amplitude, pulse width, phase, and frequency of lights emitted from the pixels is changed during a certain period when the display device is driven in the second mode.

20. A method of driving a display device that comprises a display panel comprising a fingerprint sensing area in which a plurality of pixels are provided and a plurality of photo sensors provided on one surface of the display panel overlapping the fingerprint sensing area, the method comprising:
- outputting a data signal corresponding to image data to the display panel, corresponding to a first mode; and
- receiving sensing signals from the photo sensors while supplying a driving signal corresponding to a predetermined light pattern to the display panel, corresponding to a second mode, and detecting a fingerprint of a user, based on a sensing signal corresponding to the light pattern among the received sensing signals,
- wherein at least one of instantaneous luminance and emission state of the pixel is repeatedly changed corresponding to the light pattern during the certain period when the display device is driven in the second mode.

* * * * *